United States Patent [19]

Perlman et al.

[11] Patent Number: 5,261,002
[45] Date of Patent: Nov. 9, 1993

[54] METHOD OF ISSUANCE AND REVOCATION OF CERTIFICATES OF AUTHENTICITY USED IN PUBLIC KEY NETWORKS AND OTHER SYSTEMS

[75] Inventors: Radia J. Perlman, Acton; Charles W. Kaufman, Northborough, both of Mass.

[73] Assignee: Digital Equipment Corporation, Maynard, Mass.

[21] Appl. No.: 850,593

[22] Filed: Mar. 13, 1992

[51] Int. Cl.$^5$ .......................... H04L 9/30; H04L 9/32
[52] U.S. Cl. ........................................ 380/30; 380/23; 380/25; 380/49; 340/825.31; 340/825.34
[58] Field of Search ..................... 380/23–25, 380/30, 49, 50; 340/825.31, 825.34

[56] References Cited

U.S. PATENT DOCUMENTS 4,605,820  8/1986  Campbell, Jr. .................... 380/24
4,868,877  9/1989  Fischer ........................... 380/25
5,005,200  4/1991  Fischer ........................... 380/30

Primary Examiner—Bernarr E. Gregory
Attorney, Agent, or Firm—A. Sidney Johnston; Albert P. Cefalo; Barry N. Young

[57] ABSTRACT

A technique for issuing and revoking user certificates of authenticity in a public key cryptography system, wherein certificates do not need expiration dates, and the inconvenience and overhead associated with routine certificate renewals are minimized or avoided entirely. A Certification Authority issues certificates as required, and issues a blacklist having a start date, an expiration date, and an entry for every invalid certificate issued after the start date. Users assume that every certificate issued prior to the blacklist start date is invalid, and that invalid certificates issued after the start date will be included in the current blacklist. A new blacklist is issued prior to expiration of the current one, and the blacklist start date is changed only when the blacklist becomes unmanageably long.

18 Claims, 2 Drawing Sheets

METHOD OF ISSUANCE AND REVOCATION OF CERTIFICATES OF AUTHENTICITY USED IN PUBLIC KEY NETWORKS AND OTHER SYSTEMS

BACKGROUND OF THE INVENTION

This invention relates generally to communications and other systems to which users gain access by being in possession of a valid certificate of authenticity. Access to the system may be for the purpose of communicating with other users, retrieving secure information, or receiving a service. More particularly, the invention relates to public key network security technology.

Public key encryption is a method of secure communication in which each user has a public encryption key and a private encryption key, and two users can communicate knowing only each other's public keys. An encryption key is a code or number, which, when taken together with an encryption algorithm, defines a unique mathematical transformation, used to encrypt or decrypt data. A public key system may be used in such a way as to ensure secrecy of the data or message being transmitted, i.e. to ensure that the message may not be understood by an eavesdropper, as well as to ensure the authenticity of the sender of the message. The present invention is concerned both with the authenticity issue, i.e. whether a user is who he purports to be, and whether he is authorized to receive certain information, and with the protection of privacy, by assuring that messages are encrypted under the right keys.

There are various types of public key systems. Some provide only digital signatures; others provide encryption only; and still others provide neither, but authenticate by means of a series of messages. For purposes of explanation, this specification describes an encryption technique known as an RSA scheme (named after the originators: Rivest, Shamir and Adleman). It will be understood by those knowledgeable in the art of cryptography that the principles of the invention can be applied equally well to public key systems of other types.

The manner in which a public key cryptography system operates to ensure authentication is relatively simple and may be understood without reference to the mathematical transformations that are used for encryption and decryption. In sending a message, a user A encrypts it for authenticity by transforming it using his private key (known only to user A). Another user B receiving the message decrypts it using A's public key, which A had provided or which B had obtained from a public directory. In public key cryptography systems, a user's public and private keys are selected such that the transformations that they effect are mutual inverses of each other. That is to say, the sequential application of both transformations will restore the message to its original form. More specifically, A's message, having been encrypted by application of A's private-key transformation, will be decrypted, by B, by application of A's public-key transformation. As noted earlier, this has nothing to do with maintaining the secrecy of the message, since anybody with knowledge of A's public key could effect the same decryption and obtain access to the original message. Encryption for secrecy of the data involves a second layer of encryption and decryption. Basically, user A encrypts for secrecy by performing a transformation using B's public key, and user B decrypts by performing a transformation using his (B's) private key. Since B's public and private keys also produce transformations that are mutual inverses, the application of B's private key to the encrypted message results in regeneration of the original message.

In summary, then, a public key system ensures authenticity because only the sender A has knowledge of the sender's private key. The message transformed by means of A's own private key is, in effect, a digital "signature" of the message by A. When the receiver B applies A's public key to the encrypted message and obtains a clear and intelligible message, this is confirmation that the message originated from user A, and not from some other user. Also, since only B has knowledge of his (B's) private key, only B can decrypt the message, and secrecy is thereby preserved.

A well known deficiency in such systems is that an imposter may easily deceive one of the parties. For example, an imposter $A_I$ may pretend to be A, telling B that A's public key is A's public key, thereby convincing B to accept a message that purports to be from A, but is really from the imposter $A_I$. Similarly, an imposter, $B_I$, could contact user A and say, in effect, "I am B and here is my public key," giving A instead his ($B_I$'s) public key. User A would then send a requested message to $B_I$, thinking it was going to B. The imposter $B_I$ could then decrypt the message without difficulty, using his own private key.

To deal with both types of these authentication problems, many systems use authentication certificates, the basic function of which is to vouch for the relationship between a public key and the person or entity to which it belongs. In the example discussed above, a real user B would have a certificate that says, in effect, that B is the true owner of a particular public key. User A would then not be fooled into believing that imposter $B_I$ was B, since $B_I$ would not have an appropriate certificate authenticating him as the owner of B's public key. A certificate is a cryptographically signed message indicating that a trusted authority vouches for the relationship between a public key and a named principal or owner of the key. Each certificate is "signed" by the trusted authority, known as the Certification Authority, to ensure authenticity of the certificate itself. Certificates may be held by their owners, who present copies to other users with whom they wish to communicate, or may be posted in a public place. In the context of a communication network, a "public place" is any user-accessible file or record.

The certificates may also employ a public key cryptography system to produce digital signatures, but this need not necessarily be the same system as the one for which keys are being published. Basically, the use of certificates reduces the number of public keys of which a user must obtain knowledge in some manner outside the communication system. To communicate with multiple destinations, a user must obtain knowledge of a public key for each destination. But if certificates are used, the user need only acquire knowledge of one public key, that of the Certification Authority.

For complete network security, every user must have a certificate. Sometimes, however, it is necessary to invalidate certificates; for example, when an employee is fired or transferred, or when a password falls into the wrong hands. There are two common mechanisms for accomplishing this: issuing certificates with expiration dates that define relatively short validity periods, and establishing a "blacklist" of invalid certificates.

Typically, certificates have expiration dates of a year, or some shorter period, after their issue dates. Before the expiration date of his certificate, each user must apply to the Certification Authority for a new signed certificate with a new expiration date. This mechanism has the problem that if certificate expiration times are relatively short, then the overhead of reissuing certificates can be excessive. Reissuing certificates requires that the Certification Authority perform cryptographic processing for each certificate and that the renewed certificates be communicated to all parties that store them. If certificates are stored in off-line media, this can be particularly inconvenient. In some cases, such as when "smart" cards are used, certificate renewal may require a face to face meeting between the user and the Certification Authority. Any attempt to alleviate this problem, by increasing the expiration times, poses additional problems. A fired and possibly disgruntled employee may possess an unexpired certificate, giving him a period as long as several months or more in which to access the network and possibly work mischief.

This latter problem has given rise to the second mechanism for invalidating certificates, which supplements the first and is referred to as "blacklisting." The Certification Authority issues a signed "blacklist" periodically or on demand, containing a list of the certificates that have been issued in the past, but which are now to be considered invalid. Since the blacklist will normally be short, it can be issued with much greater frequency than the individual certificates. Anyone who wishes to verify that a certificate is valid must first check that the certificate has not expired, and then that the certificate is not included in a current blacklist issued by the Certification Authority. As in the case of the certificates themselves, blacklists may be presented by the certificate holders to persons with whom they wish to communicate, or may be posted in a public place. Someone verifying the authenticity of a certificate holder may in some cases require that the blacklist be a very recent one, or that a new one be obtained.

Even when blacklists are used, certificates must still have expiration dates. If they did not, the blacklists would in time grow to be so long as to be a totally impractical mechanism. As invalid certificates expire, they can be routinely removed from the blacklist, to keep the list short and manageable.

A known alternative approach used in validating certificates is to accept a certificate if it has not expired and no unexpired blacklist can be found. Another known alternative approach is to accept a certificate if it has not expired and if the latest blacklist has expired, but not "too long" ago. Both these alternatives are less secure but more robust approaches compared with simply invalidating a certificate if the only available blacklist has expired.

It will be appreciated from the foregoing, however, that, even with the use of blacklists, there are inherent difficulties, overhead and inconvenience associated with the use of authentication certificates that must be periodically renewed. The present invention provides a novel alternative approach to the ones discussed above.

SUMMARY OF THE INVENTION

The present invention resides in a method for authenticating users of an information system and, more specifically, users of a public key cryptography system. In the method of the invention, certificates are not required to have an expiration date, so much of the inconvenience of periodic certificate renewals is avoided. A blacklist has a start date and an expiration date, and any certificates issued prior to the start date are automatically considered invalid.

Briefly, and in general terms, the method comprises the steps of issuing a signed certificate for each user of the system, wherein the signed certificate contains an issue date and any other desired public information pertaining to the user, such as a public key; issuing a signed blacklist containing a blacklist start date, a blacklist expiration date, and an entry for each user whose certificate was issued after the blacklist start time and is to be considered invalid; and determining whether a user's certificate is valid by first obtaining a copy of the certificate and a copy of the signed blacklist, then determining whether the certificate issued after the blacklist start date and is not on the blacklist, in which case the certificate is presumed to be valid.

In the context of the present invention, the term "user" includes any person, program, computer, or other entity that makes use of an information system or, more specifically, a public key cryptography system.

More specifically, the step of determining whether a user's certificate is valid further includes determining whether the blacklist has expired; and, if not, continuing with the step of determining whether the certificate issued after the blacklist start date and is not on the blacklist. There are several alternative options that can be followed if the blacklist has expired. The first is simply to presume that the certificate under consideration is invalid. The second is to determine whether the blacklist has a default expiration date that has passed. Although certificate expiration dates are no longer needed in accordance with the invention, each blacklist may include a default expiration date, which applies to all certificates with issue dates after the blacklist start date. If the blacklist has expired and the default blacklist expiration date has also passed, the certificate is considered invalid. But if the blacklist has expired and the default expiration date has not passed, the certificate may be considered valid if it is not included in the blacklist and it was issued after the blacklist start date.

A third option to be followed if the blacklist has expired is to determine whether the blacklist expiration date was more than some selected time earlier. If so, the certificate is presumed invalid. If not, the certificate is presumed valid if it is not included in the blacklist and if its issue date is after the blacklist start date.

The method of the invention further comprises the step of issuing a new blacklist prior to the blacklist expiration date. The step of issuing a new blacklist includes determining whether the current blacklist is longer than a selected length; and, if so, selecting a new start date for the new blacklist, to provide for a shorter blacklist. If a new blacklist start date is used, the method further includes a step of advising holders of valid certificates issued prior to the new blacklist start date that these certificates must be renewed to remain valid. It is also possible to renew certificates in advance of issuing a blacklist which revokes the certificates they replace, thus permitting a time interval in which to distribute those certificates.

It will be appreciated from the foregoing summary that the present invention represents a significant advance in information and communication systems that employ user authenticity certificates. In particular, the invention does not require that certificates have expiration dates, thereby avoiding the inconvenience and overhead associated with frequent certificate renewals. When the blacklist becomes too long, it can be shortened by choosing a new blacklist start date, and issuing renewed certificates to replace old valid certificates issued prior to the new blacklist start date.

The principal advantage of the invention is that certificates must be issued only when the blacklist gets too long. In the prior art, certificates must be issued periodically, where the period is determined by the time in which the blacklist might get too long. The invention is most beneficial in situations where blacklisting takes place infrequently, but involves large numbers of revocations, such as during a corporate reorganization. Other aspects and advantages of the invention will become apparent from the more detailed description, taken in conjunction with the accompanying drawings, of which the following is a brief description.

DESCRIPTION OF THE PREFERRED EMBODIMENT

Figure 1:
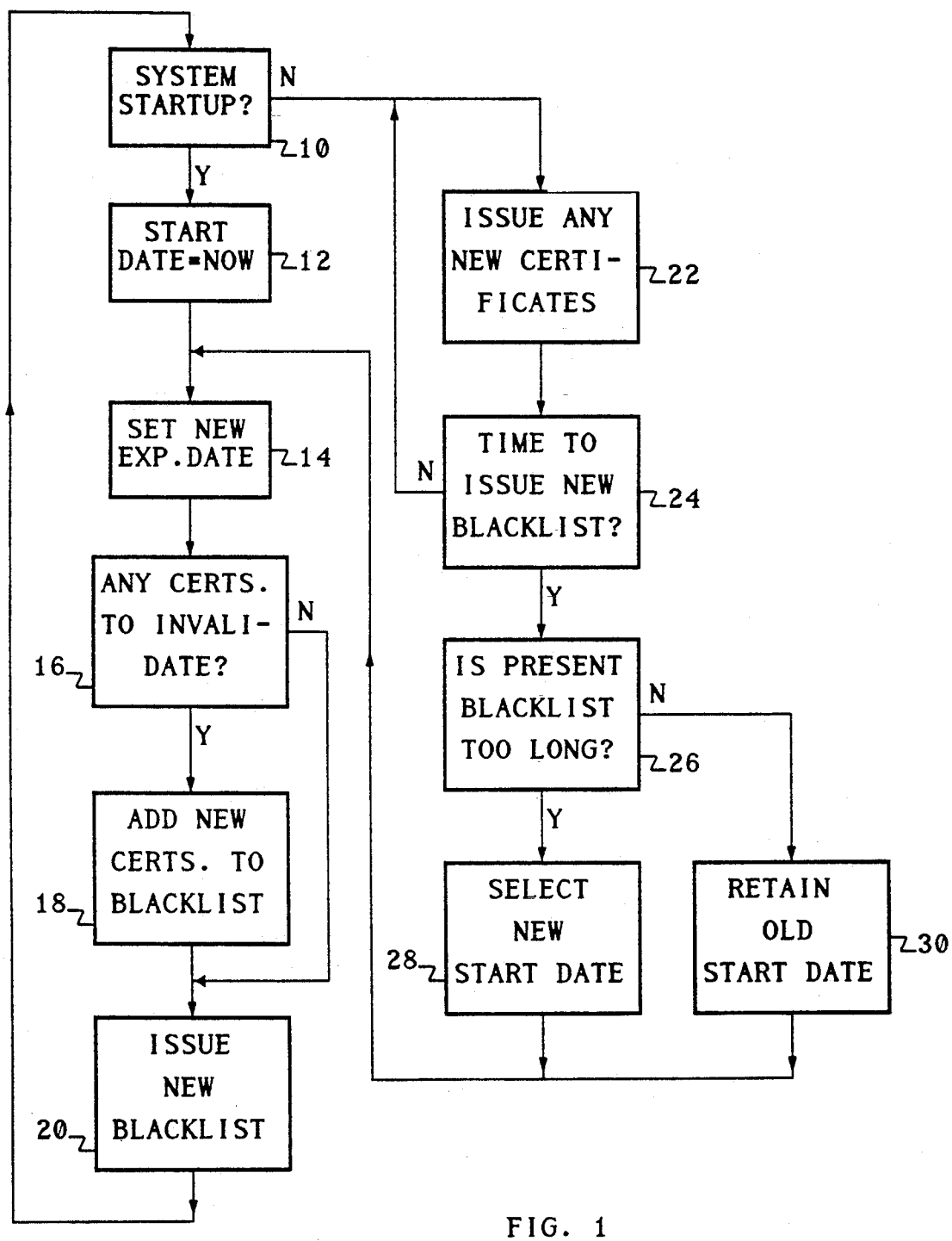
FIG. 1 is flowchart showing the steps of the method of the present invention performed by a Certification Authority.

As shown in the drawings for purposes of illustration, the present invention is concerned with a method for verifying the authenticity of a user of an information system, such as a communication network using public key cryptography. In a public key system, each user has two cryptographic keys: a private key known only to the user, and public key that is not kept secret. The two keys have the property that, when used in conjunction with an encryption algorithm, they effect mathematical transformations that are mutual inverses. That is to say, if a message is encrypted using one of the keys it can be decrypted using the other of the keys. However, the nature of the encryption algorithm is such that the private key cannot be easily discovered from knowledge of the public key and the algorithm itself.

In symbolic terms, if user A has a private key $D_A$ and a public key $E_A$, A can digitally "sign" a message M, by encrypting it using the private key $D_A$, producing a signed message $C = D_A(M)$. If the message is directed to another user B, B can verify that the message is appropriately signed by A, by applying a transformation to the message using A's public key $E_A$, the transformation being represented by:

$$E_A(C) = E_A(D_A(M)) = M.$$

If the message is to be encrypted for secrecy as well as for authenticity, user A will also transform the signed message using B's public key $E_B$, thus:

$$C = E_B(D_A(M)).$$

Then user B will effect two transformations on the encrypted and signed message he receives, using A's public key $E_A$ to verify the authenticity of the sender A, and B's private key $D_B$ to decrypt the message for secrecy:

$$E_A(D_B(C)) = E_A(D_A(E_B(D_A(M)))) = M.$$

A well known difficulty with public key systems of this type is that an imposter $B_I$ may pretend to be B, presenting A with his (the imposter's) public key and asking for information, which he may then easily decrypt, if it has been encrypted using the public key supplied by the imposter. A parallel problem is presented in authenticating the sender A, who may be impersonated by an imposter $A_I$, presenting his own ($A_I$'s) public key as A's.

The use of certificates arose to address these problems. A certificate is a digitally signed message indicating that a trusted authority (the Certification Authority) vouches for the relationship between a public key and its owner. In the example given above, a certificate for B states, in effect, that B is the legitimate owner of public key $E_B$. The certificate may also contain other information about B, concerning his employment, for example. The certificate is signed by the Certification Authority and is, therefore, acceptable to A as proof that B is the rightful owner of the public key $E_B$. Under the certificate system, an imposter having a different public key will be unable to convince A to send a message to him, or to convince B to accept a message from him.

Certificates provide a desired verification of the relationship between public keys and their rightful owners, but difficulties still arise when there is a need to invalidate certificates, such as when an employee is fired. In the prior art, each certificate also contains an expiration date some time in the future, often up to a year after the issue date. The use of expiration dates in certificates ensures that someone who has no further need for access to an information system, such as a communications network, will at least be denied access when his certificate expires. To provide for more immediate denial of access, many systems of the prior art use a blacklisting technique as well. In addition to issuing certificates, the Certification Authority publishes a blacklist, either periodically or on request. The blacklist contains an entry for every unexpired certificate that should be considered invalid for some reason. Therefore, a user wishing to verify the authenticity of another user's public key must check first to determine if there is an unexpired certificate for the other user, and then check a current blacklist to determine whether the other user's certificate has been invalidated.

The prior art approach imposes significant inconvenience on all of its users, who must periodically obtain new certificates from the Certification Authority. If the renewal period is made long enough to minimize this inconvenience, the blacklist may grow to an unwieldy size, thereby increasing system overhead in distributing it to users. On the other hand, keeping the blacklist to a more manageable size requires that the certificates be renewed more frequently, with increased inconvenience to all users.

In accordance with the present invention, the Certification Authority issues certificates that are not required to have an expiration date, and issues a blacklist containing a start date, an expiration date, and a list of any certificates that are to be considered invalid, and which have issued since the start date. Any certificates issued prior to the blacklist start date are also considered invalid. Because certificates no longer need to be renewed, the inconvenience and overhead associated with the renewal process are greatly reduced. A new blacklist, with a new expiration date, is issued prior to the expiration date of the previous one. The new blacklist will usually have the same start date, and therefore will contain the same invalid certificates as in the previous list, plus any additional certificates that have been invalidated since the printing of the previous list.

Only when the blacklist becomes too long to be conveniently managed is a new start date selected. Before the new start date, all valid certificates issued between the old start date and the new start date must be renewed. Typically, however, and depending on the rate at which certificates are invalidated, the lifetime of each certificate is much longer than would be the case if the renewal process were needed as the primary mechanism to invalidate certificates.

The steps followed by the Certification Authority in accordance with the invention are shown in FIG. 1. On the first occasion that the new system is used, as determined in block 10, the blacklist start date is set to a selected date, such as the current date, as indicated in block 12. Then the blacklist expiration date is set to some selected date in the future, as indicated in block 14. If any previously valid certificates are to be invalidated, as determined in block 16, they are added to the blacklist, as indicated in block 18. Then a new blacklist is issued (block 20), meaning that it is posted in an accessible place in the system, or possibly distributed to users of the system.

Block 22 indicates the other major function of the Certification Authority, issuing any new certificates that are needed. The certificate issuing function continues from time to time until near the expiration date of the previously issued blacklist, as determined in block 24. If the present blacklist is too long to be conveniently managed, as determined in block 26, a new start date is selected (in block 28), to shorten the blacklist as much as desired. If the current date is selected as the new start date, the blacklist will be reduced to zero, but all remaining valid certificates will need to be renewed. If the list is not too long, as determined in block 26, the old start date is retained (block 30). Regardless of which start date is used, the next step after those indicated in blocks 28 and 30 is to set a new blacklist expiration date (block 14), after which any certificates that need to be added to the list are added (block 18), and the new blacklist is issued (block 20).

Figure 2:
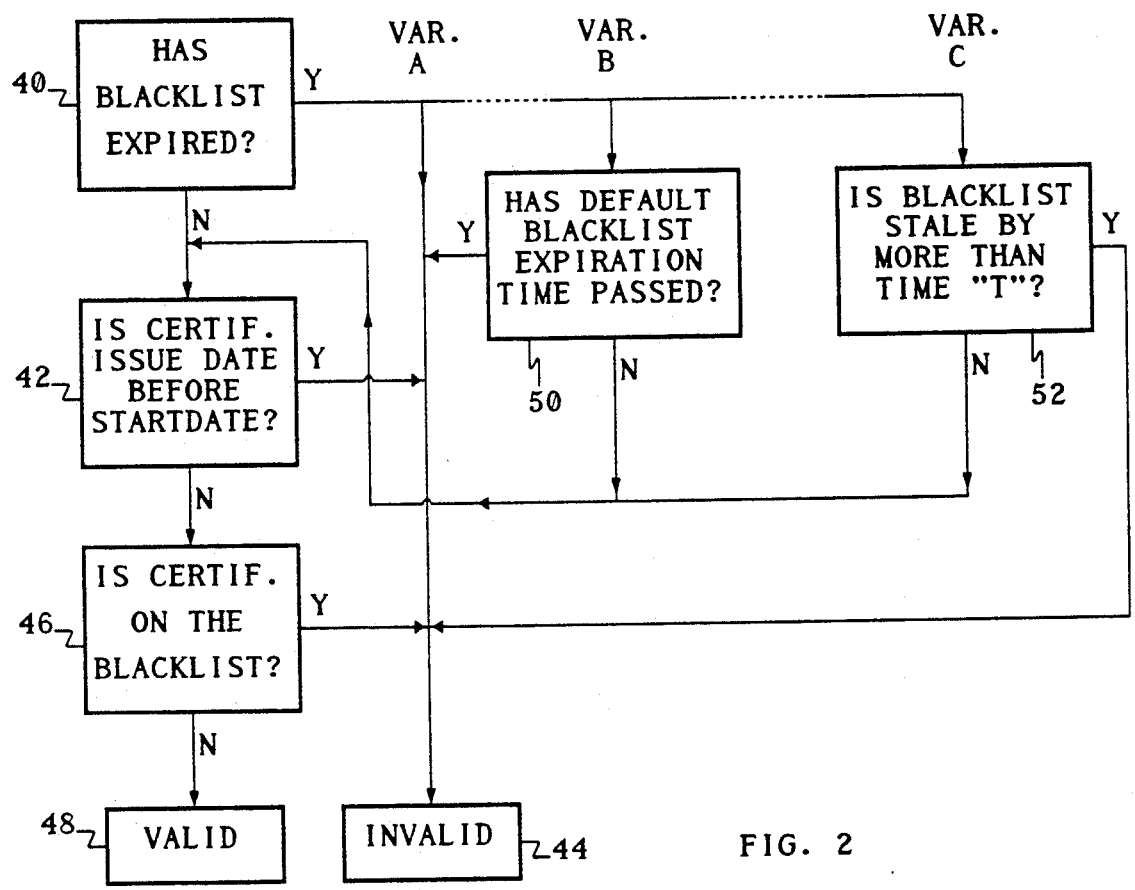
FIG. 2 is a flowchart showing the steps of the method performed a user in verifying the authenticity of another user in accordance with the invention.

From a user standpoint, the steps that are performed in accordance with the invention are those shown in FIG. 2. If a first user wishes to verify the authenticity of another user, he first obtains a copy of the other user's certificate and a copy of the blacklist. If the blacklist has not expired, as determined in block 40, the first user determines (in block 42) whether the issue date of the certificate is prior to the blacklist start date. If so, the certificate is considered to be invalid, as indicated in block 44. If not, the first user searches the blacklist for the certificate. If the certificate is found in the blacklist (block 46), a conclusion of invalidity is also reached. If the certificate is not in the blacklist, it is assumed to be valid, as indicated in block 48.

What the first user does if the blacklist has expired depends on which of three options is selected in implementing the method. In the simplest variant of the method, the certificate is assumed to be invalid if the blacklist has expired. This is shown as variant A in FIG. 2. Two other approaches, referred to as variants B and C in FIG. 2, have counterparts in the prior art. The approach in variant B is to employ a date known as the default expiration date on each blacklist. This is an expiration date that may be assigned to each blacklist, but the date is not used except in the case that the only available blacklist has expired. Then, if the default expiration date has also passed, as determined in block 50, the certificate is assumed to be invalid (block 44). If the default expiration date has not expired (block 50), the certificate may be valid, and processing continues in block 42 to make a determination of validity. The third option, indicated as variant C in FIG. 2, is to inspect the time for which the blacklist has been expired. If the blacklist has been expired longer than some preselected time T, as determined in block 52, the certificate is assumed to be invalid (block 44). Otherwise, the certificate may be valid, and processing continues in block 42. For all three variants, the invention performs better than its prior art counterpart.

It will be understood that the references to dates in the foregoing description could easily be replaced by references to certificate sequence numbers. Thus a start date could be a starting certificate sequence number. Something else to keep in mind is that, although certificate expiration dates are no longer necessary in the method of the present invention, certificates may still be given expiration dates for other purposes, unrelated to the revocation of certificates. For example, the renewal date could serve as a reminder for employees to obtain new identification cards or photographs every few years. Such a long-term renewal cycle would also serve to allow the blacklist to be periodically shortened without the need for mass renewals of certificates.

It will be appreciated from the foregoing that the present invention represents a significant advance in the field of information systems in which multiple users need to obtain authentication of each other's identities before permitting access to certain restricted information. In particular, the invention provides a modified authentication certificate and blacklist technique in which certificates do not need to have expiration dates, thereby avoiding frequent and inconvenient certificate renewal cycles. It will also be appreciated that, although an embodiment of the invention has been described in detail for purposes of illustration, various modifications may be made without departing from the spirit and scope of the invention. Accordingly, the invention is not to be limited except as by the following claims.

We claim:

1. A method for authenticating users of an information system, comprising the steps of:
   issuing a signed certificate for each user of an information system, wherein the signed certificate contains an issue date, a unique public key associated with the user, and other public information pertaining to the user, and wherein a valid certificate is one that authenticates an association between the user and the public key contained in the certificate, and an invalid certificate is one for which the association between the user and the public key is no longer valid;
   issuing a signed list of invalid certificates, referred to as a blacklist, containing a blacklist start date, a blacklist expiration date, and an entry for each user whose certificate was issued after the blacklist start date and is invalid; and
   determining whether a user's certificate is valid by first obtaining a copy of the certificate and a copy of the signed blacklist, then determining whether the blacklist has expired, and then, if the blacklist has not expired, determining whether the certificate issued after the blacklist start date and is not on the blacklist, and is therefore valid.

2. A method as defined in claim 1, and further comprising:
if the blacklist has expired, concluding that the certificate is invalid.

3. A method as defined in claim 1, and further comprising:
if the blacklist has expired, determining whether the blacklist has a default expiration date that has passed;
if the blacklist has a default expiration date that has not passed, concluding that the certificate is invalid; and
if the blacklist has a default expiration date has not passed, continuing with the step of determining whether the certificate issued after the blacklist start date and is not on the blacklist.

4. A method as defined in claim 1, and further comprising:
if the blacklist has expired, determining whether the blacklist expired more than a selected time earlier;
if the certificate expired more than a selected time earlier, concluding that the certificate is invalid; and
if the certificate expired less than a selected time earlier, continuing with the step of determining whether the certificate issued after the blacklist start date and is not on the blacklist.

5. A method as defined in claim and further comprising:
issuing a new blacklist prior to the blacklist expiration date.

6. A method as defined in claim 5, wherein the step of issuing a new blacklist includes:
determining whether the current blacklist is longer than a selected length; and, if so,
selecting a new start date for the new blacklist, to provide for a shorter blacklist, and advising holders of valid certificates issued prior to the new blacklist start date that these certificates must be renewed to remain valid.

7. A method for authenticating users of a public key cryptographic system, comprising the steps of:
issuing a signed certificate for each user of a public key cryptographic system, wherein the signed certificate contains an issue date, a unique public key associated with the user, and other public information pertaining to the user, and wherein a valid certification is one that authenticates an association between the user and the public key contained in the certificate, and an invalid certificate is one for which the association between the user and the public key is no longer valid;
issuing a signed list of invalid certificates, referred to as a blacklist, containing a blacklist start date, a blacklist expiration date, and an entry for each user whose certificate was issued after the blacklist start date and is invalid; and
determining whether a user's certificate is valid by first obtaining a copy of the certificate and a copy of the signed blacklist, then determining whether the blacklist has expired, and then, if the blacklist has not expired, determining whether the certificate issued after the blacklist start date and is not on the blacklist, and is therefore valid.

8. A method as defined in claim 7, and further comprising:
if the blacklist has expired, concluding that the certificate is invalid.

9. A method as defined in claim 7, and further comprising:
if the blacklist has expired, determining whether the blacklist has a default expiration date that has passed;
if the blacklist has a default expiration date that has passed, concluding that the certificate is invalid; and
if the blacklist has a default expiration date that has not passed, continuing with the step of determining whether the certificate issued after the blacklist start date and is not on the blacklist.

10. A method as defined in claim 7, and further comprising:
if the blacklist has expired, determining whether the blacklist expired more than a selected time earlier;
if the certificate expired more than a selected time earlier, concluding that the certificate is invalid; and
if the certificate expired less than a selected time earlier, continuing with the step of determining whether the certificate issued after the blacklist start date and is not on the blacklist.

11. A method as defined in claim 7, and further comprising:
issuing a new blacklist prior to the blacklist expiration date.

12. A method as defined in claim 11, wherein the step of issuing a new blacklist includes:
determining whether the current blacklist is longer than a selected length; and, if so,
selecting a new start date for the new blacklist, to provide for a shorter blacklist, and advising holders of valid certificates issued prior to the new blacklist start date that these certificates must be renewed to remain valid.

13. A method for authenticating users of a public key cryotpgraphic system, comprising the steps of:
issuing a signed certificate for each user of a public key cryptographic system, wherein the signed certificate contains an issue sequence number, a unique public key associated with the user, and other public information pertaining to the user, and wherein a valid certificate is one that authenticates an association between the user and the public key contained in the certificate, and an invalid certificate is one for which the association between the user and the public key is no longer valid;
issuing a signed list of invalid certificates, referred to as a blacklist, containing a blacklist start sequence number, a blacklist expiration date, and an entry for each user whose certificate has a sequence number greater than the blacklist start sequence number and is to be considered invalid; and
determining whether a user's certificate is valid by first obtaining a copy of the certificate and a copy of the signed blacklist, then determining whether the blacklist has expired, and then, if the blacklist has not expired, determining whether the certificate has a sequence number greater than the blacklist start sequence number and is not on the blacklist, and is therefore valid.

14. A method as defined in claim 13, and further comprising:
if the blacklist has expired, concluding that the certificate is invalid.

15. A method as defined in claim 13, and further comprising:
- if the blacklist has expired, determining whether the blacklist has a default expiration date that has passed;
- if the blacklist has a default expiration date that has passed, concluding that the certificate is invalid; and
- if the blacklist has a default expiration date that has not passed, continuing with the step of determining whether the certificate has a sequence number greater than the blacklist starting sequence number and is not on the blacklist.

16. A method as defined in claim 13, and further comprising:
- if the blacklist has expired, determining whether the blacklist expired more than a selected time earlier;
- if the certificate expired more than a selected time earlier, concluding that the certificate is invalid; and
- if the certificate expired less than a selected time earlier, continuing with the step of determining whether the certificate has a sequence number greater than the blacklist staring sequence number and is not on the blacklist.

17. A method as defined in claim 13, and further comprising:
- issuing a new blacklist prior to expiration of the blacklist.

18. A method as defined in claim 17, wherein the step of issuing a new blacklist includes:
- determining whether the current blacklist is longer than a selected length; and, if so,
- selecting a new start sequence number for the new blacklist, to provide for a shorter blacklist, and advising holders of valid certificates issued with sequence numbers smaller than the new blacklist start sequence number that these certificates must be renewed to remain valid.

* * * * *